US007811049B2

(12) United States Patent
Xu

(10) Patent No.: US 7,811,049 B2
(45) Date of Patent: Oct. 12, 2010

(54) FLOW CONTROL ARRANGEMENT

(75) Inventor: Liping Xu, Cambridge (GB)

(73) Assignee: Rolls-Royce, PLC, London (GB)

( * ) Notice: Subject to any disclaimer, the term of this patent is extended or adjusted under 35 U.S.C. 154(b) by 235 days.

(21) Appl. No.: 12/081,342

(22) Filed: Apr. 15, 2008

(65) Prior Publication Data

US 2009/0047117 A1 Feb. 19, 2009

Related U.S. Application Data

(63) Continuation of application No. 11/074,676, filed on Mar. 9, 2005, now abandoned.

(30) Foreign Application Priority Data

Apr. 13, 2004 (GB) ................................ 0408126.1

(51) Int. Cl.
*F02C 9/18* (2006.01)

(52) U.S. Cl. ....................... 415/54.1; 415/145; 415/914

(58) Field of Classification Search ................ 415/54.1, 415/57.1–57.4, 58.1–58.7, 145, 914
See application file for complete search history.

(56) References Cited

U.S. PATENT DOCUMENTS

| | | | | |
|---|---|---|---|---|
| 3,620,640 | A | | 11/1971 | Soulez-Lariviere |
| 4,086,022 | A | * | 4/1978 | Freeman et al. ............ 415/119 |
| 5,282,718 | A | | 2/1994 | Koff et al. |
| 5,431,533 | A | | 7/1995 | Hobs |
| 5,607,284 | A | | 3/1997 | Byrne et al. |
| 6,585,479 | B2 | | 7/2003 | Torrance |

FOREIGN PATENT DOCUMENTS

| | | |
|---|---|---|
| EP | 0 719 908 A1 | 7/1996 |
| FR | 1 136 881 | 5/1957 |
| WO | WO 92/03661 | 3/1992 |

OTHER PUBLICATIONS

Hathaway, "Self-Recirculating Casing Treatment Concept for Enhanced Compressor Performance," NASA/TM—2002-211569, pp. 1-10, Jul. 2002.

* cited by examiner

*Primary Examiner*—Igor Kershteyn
(74) *Attorney, Agent, or Firm*—Oliff & Berridge, PLC

(57) ABSTRACT

A flow control arrangement is provided for a gas turbine engine in which an inlet slot is positioned prior to a stationary structure such as a stator or pylon in order that air flow is bled or removed from a mainflow. The removed air passes through a passage duct and is re-injected through an outlet nozzle with an askew angle consistent with an angle of rotor blades of a turbine. In such circumstances, distortion in the flow due to the stationary structure is relieved such that there is less instability downstream from that structure.

17 Claims, 4 Drawing Sheets

FLOW CONTROL ARRANGEMENT

CROSS-REFERENCE TO RELATED APPLICATIONS

This is a Continuation of application Ser. No. 11/074,676 filed Mar. 9, 2005. The disclosure of the prior application is hereby incorporated by reference herein in its entirety.

BACKGROUND

The present invention relates to flow control arrangements and more particularly to such arrangements utilised within turbine engines.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

As can be seen there are a number of fixed structures such as pylons and stator vanes utilised in order to control air flow and also to support casing structures, etc. These structural features create flow distortions further downstream and/or upstream, and these distortions can reduce the stability margin of downstream components. Furthermore, it is known that the onset of instability in terms of rotating stall/surge is triggered by such distortions but is not random but always occurs in a particular location relative to the structure induced distortion.

Conventional approaches to addressing instability in the flow relate to so-called casing treatment in terms of creating casing distortions, that is to say bumps and hollows to adjust and stabilise fan exit flow distortion, etc as well as asymmetrical flow path cross-sections. Such approaches can significantly add to engine complexity and more importantly may reduce engine efficiency.

Stationary distortions usually occur in an otherwise axisymmetric designed device due to structural requirements, such as fan exit flow distortion caused by a pylon. The situation is graphically illustrated in FIG. 2 below. The view is that looking down from the fan 101 tips and the air flows into the engine from the left side. The presence of a pylon 100 causes high pressure in front of it (p+) and further away in the two sides the pressure is relatively low (marked as p−). The pressure field of the pylon 100 may also transmit into the core compressor to induce an inlet flow distortion in that core. A fan and compressor subject to such distortions in general show a reduced stability margin which may endanger the engine during operation. Guide vanes 102 may also be provided and these vanes will add to potential complexity.

In addition to use of passive casing treatments it will also be understood that active control techniques with regard to compressor stabilities can be used whereby specific control elements are adjusted to achieve stability during operation. These control elements may include altering through flap movements the available flow cross-section and also injecting additional control air feeds. These techniques as indicated add significantly to complexity and cost.

SUMMARY

In accordance with the present invention there is provided a flow control arrangement for turbine engines, the arrangement comprising a turbine to force fluid flow directed towards a stationary structure through a conduit whereby that fluid flow is susceptible to distortion instability downstream from the stationary structure, the arrangement characterised in that a slot in the conduit prior to the stationary structure is provided in order to remove in use fluid from that fluid flow and an outlet provided prior to the turbine through which the removed fluid is released.

Generally, the slot is substantially aligned with the stationary structure.

Normally, the fluid is air.

Normally, the outlet is also aligned with the stationary structure with a predetermined angular offset.

Typically, the stationary structure is a pylon or guide vaneor a non axisymmetric intake.

Generally, the outlet has a trenched end.

Normally, the slot presented width to the stationary structure is determined for flow removal in order to provide flow stability downstream of that stationary structure. Similarly, the position of the slot relative to the structure is chosen to provide flow stabilisation.

Generally, removed fluid passes along a passage from the slot to the outlet. Normally, the removed fluid utilises the pressure of the fluid flow in order to drive removed fluid movement along the passage.

Preferably, the passage incorporates diffuser vanes at the slot. Normally, the outlet incorporates presentation vanes for release of the removed fluid.

Also, in accordance with the present invention there is provided an engine incorporating an arrangement as described above.

BRIEF DESCRIPTION OF THE DRAWINGS

Embodiments of the present invention will now be described by way of example and with reference to the accompanying drawings in which.

DETAILED DESCRIPTION

The present invention combines active control of turbine compressor stabilities and passive casement treatment to limit dynamic losses due to mixing downstream of a stable structure. Essentially, there is a fluid bleed from high pressure air at a location where flow pressure is high and that removed fluid is re-injected back into the flow close to a rotor turbine leading edge at the tip and with flow location at the correct flow angle relative to the rotor blade of the turbine. As the removed fluid bleeding and re-injection are specifically localised it will be understood that the fluid mass flow involved is typically only a fraction of a percentage of the total fluid mass flow through the engine casing conduit incorporating the turbine. Additionally, as the removed fluid is taken at an overpressurised flow location, the tendency of the fluid flow to form a high pressure blockage will be relieved and some efficiency benefit is normally achieved as well as improved flow stability margin downstream of the stationary structure.

Figure 1:
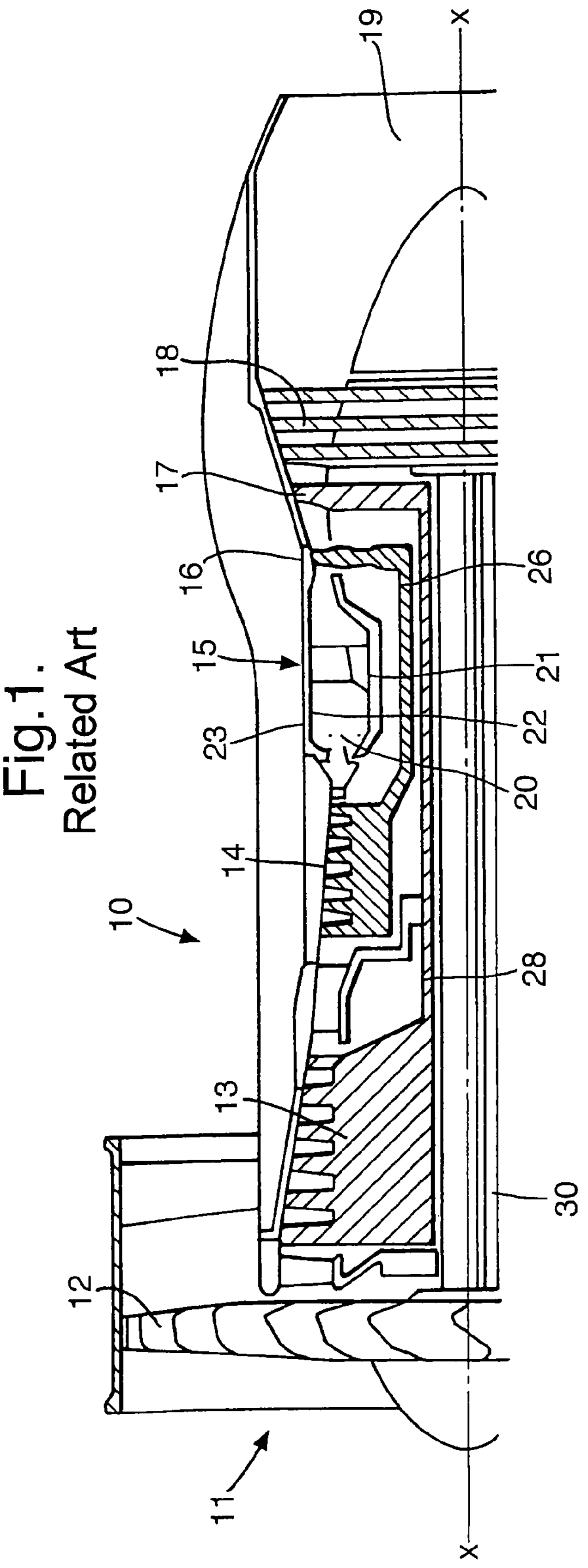
Fig.1. Related Art
FIG. 1 illustrates a general configuration of a gas turbine engine.
Figure 2:
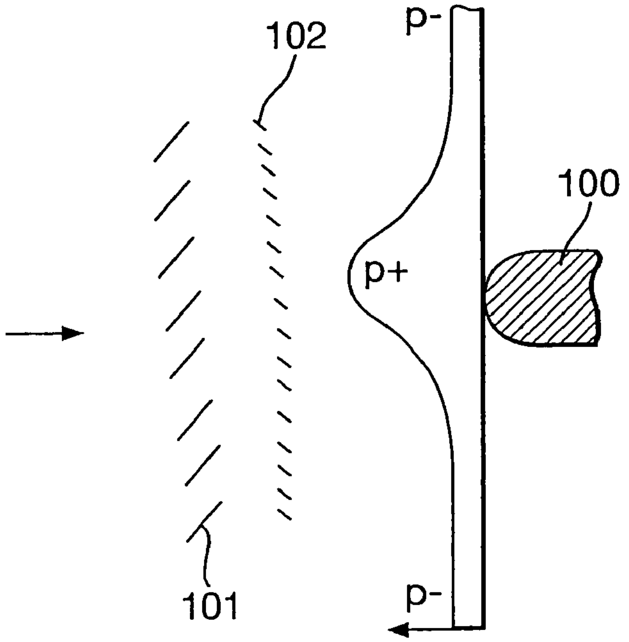
Fig.2. Related Art
FIG. 2 is a graphical illustration of a pressure field caused by a stationary distortion.
Figure 3:
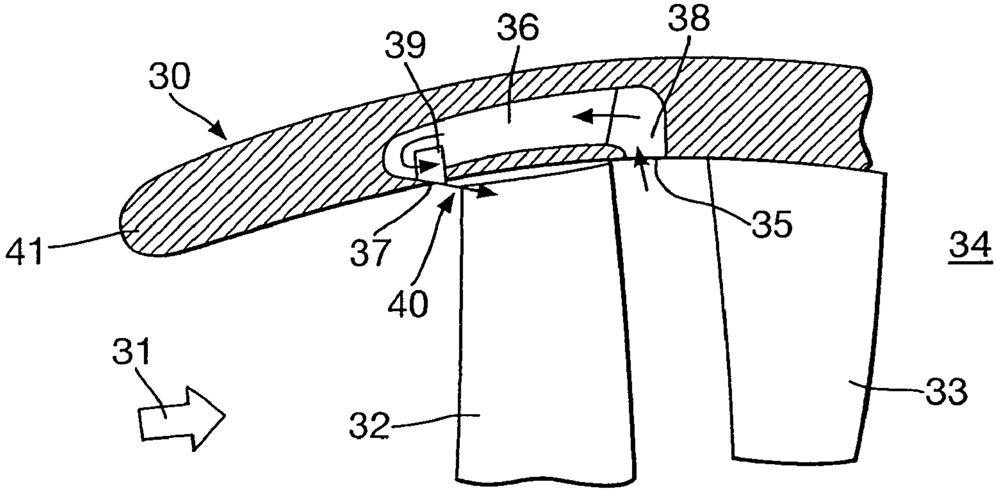
FIG. 3 is a schematic cross-section of an arrangement in accordance with a first embodiment of the present invention.

As indicated above, air flows through an engine such as that schematically illustrated in FIG. 3 may be axisymmetrically or non axisymmetrically presented. For example, for accommodation purposes it is not unusual to provide for inlet droop with regard to an engine used in an aircraft and this inherently creates non axisymmetrically flows through that engine. With such non axisymmetric flows in particular, it is possible for distortions downstream of static structures such as stator vanes or pylons to cause distortions which in turn result in the onset of instability in the flow with detrimental consequences with regard to engine efficiency.

Figure 4:
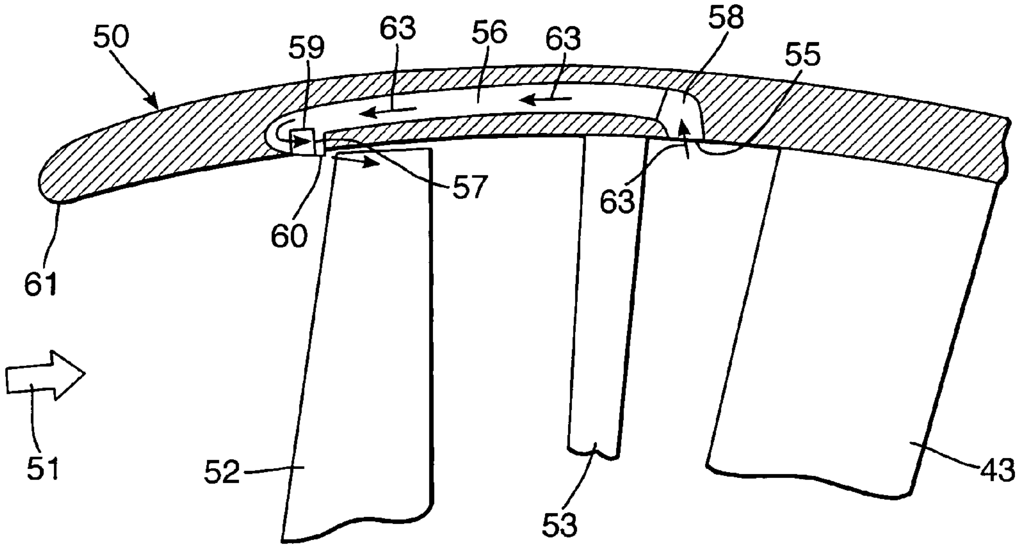
FIG. 4 is a schematic cross-section of an arrangement in accordance with a second embodiment of the present invention.

FIGS. 3 and 4 illustrate two potential embodiments of the present invention. FIG. 3 illustrates a flow control arrangement 30 in which an air flow 31 is forced by rotor blades 32 of a turbine in the direction depicted. Downstream of the turbine formed by blades 32 is a fixed stator structure 33. The distortion presented at inlet 31 will cause premature instability. It has been found that the positions of such instability are predictable and so in accordance with the present invention air is bled from positions prior to the stator 33 in order to rectify flow distortions due to angular presentation of flow to the turbine rotor blades 32 and/or stator 33.

In accordance with the present invention, a slot 35 is provided intermediate to the rear of the blades 32 and the front edge of the stator 33. This slot 35 collects or removes air flow. The removed air flows along a duct 36 and is re-injected through an outlet nozzle 37. The slot 35 is associated near its entrance with diffuser vanes 38 which act to de-swirl the bled or removed air flow in order to reduce flow losses within the duct 36. Generally, the duct 36 progressively narrows from the inlet slot 35 end to the outlet nozzle 37 end. It is necessary to provide a wider cross-section towards the slot 35 end of the duct 36 in order not to cause any resistance to bleed removal of air flow. However, the narrower cross-section towards the outlet nozzle 37 end allows vanes 39 to present the re-injected air flow at the correct angle dependent upon rotor blade 32 angle within its turbine.

Normally, as described later the outlet nozzle 37 has a trenched end configuration whereby a bottom edge extends down below the notional casing conduit inner surface in order to present a re-injected air flow 40 towards the tips of the blades 32. As described previously, the angle of the re-injected flow 40 will be facilitated by the vanes 37 and chosen dependent upon the angle of the blades 32 in the turbine driving flow 31 towards the stator 33.

The size and position of the inlet slot 35 will be chosen dependent upon operational requirements in terms of the rate of airflow 31, blades 32 and stator 33 as well as necessary action to prevent distortion and subsequently instability at positions downstream of the stator 33. Generally, the inlet slot 35 will be oval and have a ratio in the order of 4. The major dimension of that oval will be presented across the stator 33 or other structure. Typically, the width of the slot 35 will be greater than several pitches of the stator 33.

The inlet slot 35 is typically flush with the surface of a casing conduit 41 within which the flow 31 is directed. It will be understood that such flush presentation of the inlet slot 35 avoids possible turbulence created by a raised or a sunken position.

It will be appreciated that the distortion and therefore instability created by the static may vary with flow 31 rate. In such circumstances it may be possible within the duct 36 to provide for reduced or enhanced re-injected flow 40. Reduction in the re-injected flow 40 may be achieved by bleeding from the duct 36 to reduce the returned air volume whilst increasing that volume may be achieved through pressurised air addition to the flow through the duct 36 removed from flow 31 via the inlet slot 35. Nevertheless, as indicated above, these approaches add significantly to complexity and will normally be avoided in accordance with the present invention.

FIG. 4 illustrates a second embodiment of the present invention as a schematic part cross-section. Thus, a flow control arrangement 50 comprises a rotor blade 52 as part of a turbine to drive an air flow 51 in the direction of the arrowhead towards a guide vane 53 and a pylon 43. As previously, the guide vane 53 and pylon 43 are stationary and may cause distortions and therefore instability in the rotor 52. The rotor blades 52 form part of a turbine within a casing conduit 61 generally supported by the pylon 43 and within which guide vanes 53 are presented for appropriate airflow 51 angular presentation.

In accordance with the present invention an inlet slot 55 bleeds or removes air from the flow 51 into a passage 56 which is then re-injected through an outlet nozzle 57 at the tip periphery of the rotor blades 52 of the turbine. In such circumstances removed air passes in the direction of arrowheads 63 through the duct passage 56. As described previously generally the passage 56 has a wider cross-section towards the inlet slot 55 end in comparison with the outlet nozzle 57 end. Diffuser vanes 58 are provided near the entrance of the inlet slot 55 in order to reduce swirl and so flow losses through the duct 56. Vanes 59 are provided near the trenched outlet nozzle 57 in order that the re-injected air flow 60 is appropriately angularly presented to the tips of the blades 52.

It will be understood that the embodiments depicted in FIGS. 3 and 4 generally operate in accordance with the present invention in a similar fashion. Thus the re-injection outlet nozzle 37, 57 is located just upstream from the rotor blade 52 turbine bank beneath the casing conduit 61. The outlet nozzle 37, 57 has a width of approximately the width of a rotor pitch. As described above the outlet nozzle 37, 57 will have a trench step in order to minimise mis-alignment of the re-injected flow 40, 60 with the main flow 31, 51 respectively. Importantly, each outlet nozzle 37, 57 incorporates vanes 39, 59 to provide angular presentation to the re-injected flow 37, 57 removed from the main flow via the inlet slots 35, 55. Thus, the re-injected flows 37, 57 are directed towards the rotor blades 32, 52 staggered directional angle.

It will be understood that bled or removed flow and re-injection in accordance with the present invention in order to avoid distortion and subsequent instability is only needed for the distorted part of the flow circumference, that is to say about stationary structures such as stator, guide vanes or pylons. The relatively high pressure behind rotors 32, 52 is utilised in order to drive removed or bled flow through the duct passages 36, 56 and this bleeding of the air fluid flow relieves the high pressure distortion. The use of vanes 39, 59 as indicated creates askewed angular high speed re-injection of air flows 40, 60 towards the blades 32, 52 which is concentrated at the tips of those blades 32, 52. In such circumstances the present invention provides improved resistance to instability caused by distortion. In effect distortion is suppressed by bleeding air flow from the high pressure part of the circumference. Clearly, with respect to removal of instability there is a significant improvement in efficiency and overall pressure rise.

As indicated above, generally flow is removed or bled through an inlet slot due to the localised high pressure at differing positions on the circumference. It will be appreciated that these localised high pressures are due to axi-symmetric flow so that the inlet slot may be substantially aligned with the stationary structure such as a pylon or stator or positioned to one side or the other depending upon presented flow from the rotor blade turbine assembly. Such localised collection of bled or removed fluid air flow may possibly relieve flow blockage towards the rear of the turbine. The removed high pressure fluid flow is de-swirled using diffuser vanes and subsequently vented through a duct passage to an outlet slot or nozzle appropriately positioned in front of the rotor blades. The exit of the outlet nozzle or slot has small vanes in order to guide and direct the injected flow towards rotor blade tips. This injected flow at the rotor tips suppresses any instability. As indicated above, a local trenched step in the outlet nozzles helps to keep the injected flow adjacent to and in the vicinity of the casing conduit at the rotor blade tips.

Figure 5:
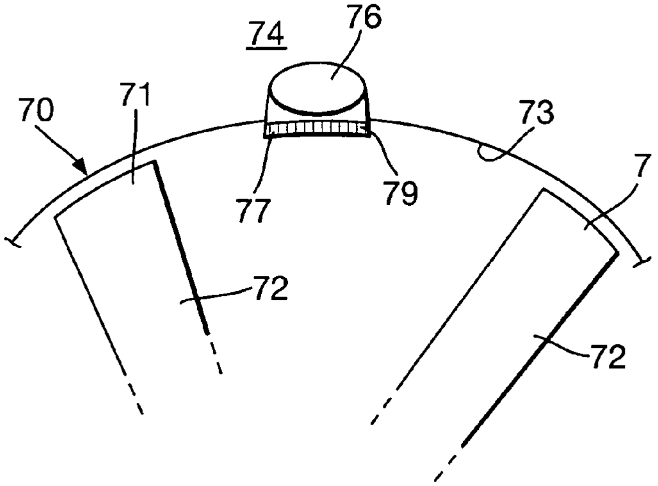
FIG. 5 is a schematic front view of an outlet in accordance with the present invention as viewed upstream from a stationary structure; and, FIG. 6 is a schematic plan cross-section illustrating the arrangement depicted in FIG. 4.

FIG. 5 provides a part schematic cross-section illustrating an arrangement in accordance with the present invention. Thus, a flow control arrangement 70 includes a turbine with rotating rotor blades 72 which drive an air flow in the direction perpendicularly out of the plane of the drawing. In accordance with the present invention a duct passage 76 is provided through which the bled or removed air passes in order that that air can be re-injected prior to the blades 72. An outlet nozzle 77 includes vanes 79 which act to direct the injected air flow towards tip portions 71 of the blades 72 as they rotate past the outlet nozzle 77. Generally, the injected flow remains close to the inner surface 73 of a casing conduit 74 within which the duct passage 76 is formed.

Figure 6:
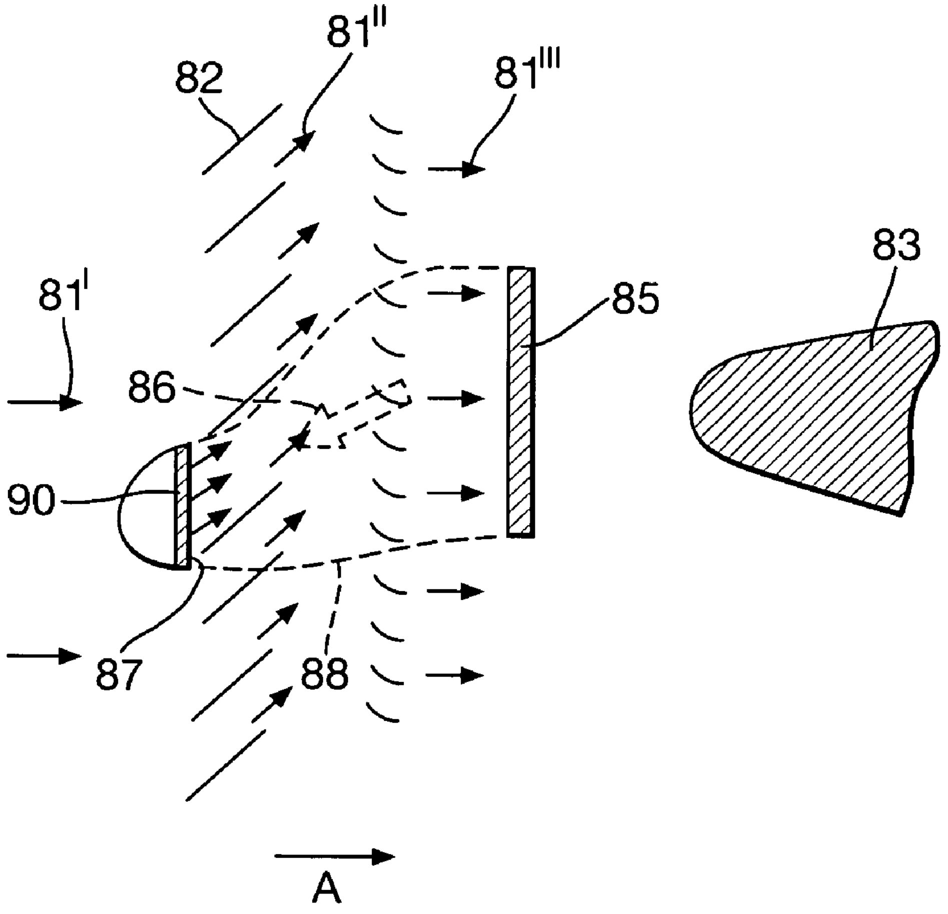

FIG. 6 is a schematic part plan view of an arrangement in accordance with the present invention. A pylon 83 is positioned relative to a rotor turbine bank 82 with guide vanes 83 positioned to straighten air flow 81 as it progresses in the direction of arrowhead A. It will be appreciated that the turbine 82 forces flow 81 through a conduit (not shown). In accordance with the present invention an inlet slot 85 is positioned relative to the pylon 83 in order to relieve high pressure. As indicated previously, the removed or bled fluid air flow passes through a duct passage (not shown) to an outlet nozzle 87 upstream of the turbine 82. A re-injected flow 90 is presented through the outlet 87 utilising vanes within that outlet 87 in order that the flow 90 is appropriately skewed and angled relative to the blades of the turbine 82. Broken line arrow 86 shows the direction of removed air flow from the inlet slot 85 to the outlet nozzle 87. It will also be noted that the notional passage shown by broken lines 88 indicates the constriction from that inlet slot 85 to the outlet slot 87. In such circumstances the inherent nature of such presentation of the removed or bled air forces projection of the flow 90 through the vanes of the outlet 87 in order to avoid creation of distortion in the overall flow 81 and so instability, particularly subsequent to pylon 83.

As described above, the actual presented aspect width of the inlet slot utilised in accordance with the present invention will depend upon a number of factors including the width of the structure which may cause distortion and therefore downstream instability as well as the flow rate and turbine blade structure. The inlet slot will generally be oval or a rectangular slit in order to ensure that appropriate fluid flow removal or bleed is achieved. Generally the presented cross-section will be greater than the width of the structure downstream.

The position of the outlet nozzle will be chosen in order to provide best relief of distortions and therefore instability in the main fluid airflow. Thus, as depicted in FIG. 6, the outlet nozzle 87 is slightly askew and not aligned with the pylon 83. In such circumstances it will be appreciated that the dimensions, position and relative alignments of the principal elements, that is to say inlet slot, outlet nozzle and stationary structure may be varied by operational and performance criteria and requirements. Nevertheless, only a fraction of a percentage of the overall main fluid air flow will be bled through the inlet slot for re-injection such that there will be little significant effect upon the overall mass flow through an engine incorporating an arrangement in accordance with the present invention.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A flow control arrangement for a turbine engine, comprising:

- an array of rotor blades rotatable in use in an annular flow conduit carrying a fluid flow;
- a stationary structure toward which the fluid flow is directed, the stationary structure causing a discrete localised distortion of the fluid flow;
- a slot provided in the annular flow conduit downstream of the array of rotor blades to remove in use fluid from the fluid flow; and
- an outlet provided upstream of the array of rotor blades to which the removed fluid flows from the slot and through which the removed fluid is released to counteract the discrete localised distortion of the fluid flow.

2. An arrangement as claimed in claim 1 wherein the slot is substantially aligned with the stationary structure.

3. An arrangement as claimed in claim 1 wherein the fluid is air.

4. An arrangement as claimed in claim 1 wherein the outlet is aligned with the stationary structure with a pre-determined angular offset.

5. An arrangement as claimed in claim 1 wherein the stationary structure is one of a pylon or guide vane or drooped inlet or non-axisymmetric intake.

6. An arrangement as claimed in claim 1 wherein the outlet has a trenched end.

7. An arrangement as claimed in claim 1 wherein the slot presented width to the stationary structure is determined for flow removal in order to provide flow stability downstream of the stationary structure.

8. An arrangement as claimed in claim 1 wherein a position of the slot relative to the stationary structure is chosen to provide flow stabilisation.

9. An arrangement as claimed in claim 1 wherein the removed fluid passes along a passage from the slot to the outlet.

10. An arrangement as claimed in claim 9 wherein the removed fluid utilises a pressure of an outlet of the array of rotor blades to drive movement of the removed fluid along the passage.

11. An arrangement as claimed in claim 1 wherein the slot includes diffuser vanes.

12. An arrangement as claimed in claim 9 wherein the slot includes diffuser vanes to de-swirl flow of the removed fluid to facilitate movement through the passage.

13. An arrangement as claimed in claim 1 wherein the outlet includes guide vanes to guide the removed fluid released from the outlet toward the array of rotor blades.

14. An arrangement as claimed in claim 13 wherein the guide vanes direct flow released from the outlet for consistency with the angle of the blades of the array.

15. An arrangement as claimed in claim 9 wherein the passage is shaped to facilitate at least one of: removal of fluid flow by the slot; and presentation of the removed fluid to the outlet for appropriate release prior to the array of rotor blades.

16. An arrangement as claimed in claim 15 wherein the passage narrows or constricts from the slot to the outlet.

17. A turbine engine incorporating an arrangement as claimed in claim 1.

* * * * *